Oct. 7, 1952   E. E. HOWE   2,612,647
METHOD OF FORMING WELDING PROJECTIONS ON NUTS
Filed June 2, 1950

Inventor
Earl E. Howe
by Parker & Carter
Attorneys

Patented Oct. 7, 1952

2,612,647

UNITED STATES PATENT OFFICE 2,612,647

METHOD OF FORMING WELDING PROJECTIONS ON NUTS

Earl E. Howe, Chicago, Ill.

Application June 2, 1950, Serial No. 165,777

1 Claim. (Cl. 10—86)

My invention relates to an improvement in nuts, and has for one purpose to provide a nut which can be applied to and secured in relation to another part such as a sheet.

Another purpose is to provide a nut which can be quickly and economically applied to a sheet.

Another purpose is to provide a nut and improved means and method of securing the nut in relation to a sheet or other supporting member.

Another purpose is to provide an improved weld nut with extruded welding projections extending beyond the plane of one end of the nut.

Another purpose is to provide a nut which shall be efficient and economical.

Other purposes will appear from time to time in the course of the specification and claims.

The present application is a division of my co-pending application Serial No. 560,984, filed in the United States Patent Office on October 30, 1944.

I illustrate my invention more or less diagrammatically in the accompanying drawings wherein.

Like parts are indicated by like symbols throughout the specification and drawings.

Figure 1:
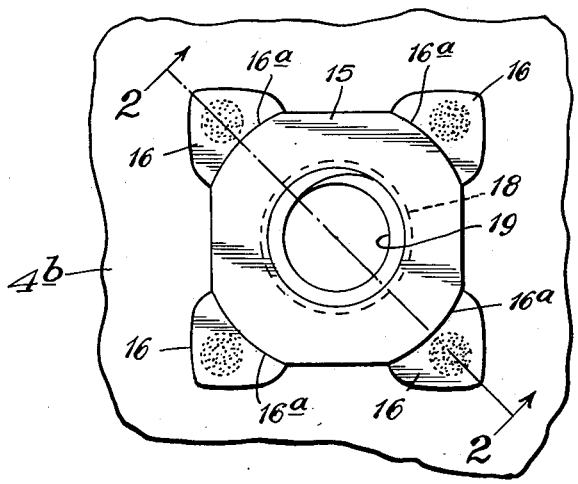
Figure 1 is a plan view of a form of my nut.

Referring to the drawings, I illustrate a nut having a generally square body 15, which, for example, may be formed from a rectangular blank. 19 indicates any suitable screw-threaded central aperture.

Figure 3:
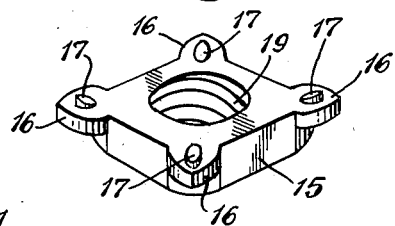
Figure 3 is a perspective of the nut shown in Figures 1 and 2.
Figure 4:
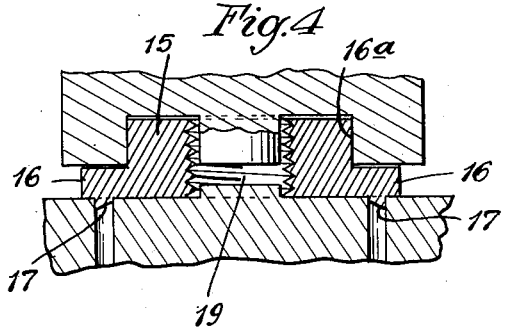
Figure 4 is a diagrammatic illustration of a vertical section through a forming die and nut.

In the formation of the nut it is suitably struck by a die at its corners, the metal being left free to extend outwardly. The result is the provision of corner projections formed as at 16, if the die is opened or apertured to permit the formation of projections 17, adapted for projection welding. It will be understood that the shape of the projections may be suitably varied, but I illustrate, as shown in detail in Figure 3, corner welding projections which extend outwardly from the generally plane surface of one end of the nut body 15.

Figure 2:
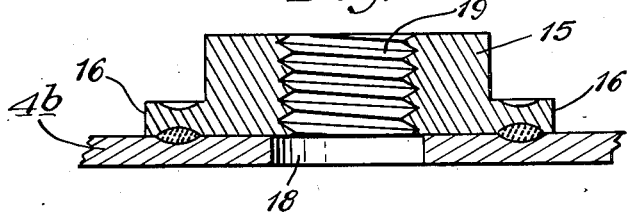
Figure 2 is a section on the line 2—2 of Figure 1.

The nut is shown in Figures 1 and 2 as welded to any suitable sheet 4b, with its screw-threaded aperture 19 aligned with any suitable aperture 18 in the plate.

In the formation of my nut I may employ, for example, a circular punch which engages the corners of the body 15 and strikes out the ears or corner projections 16. 16a indicates the inner surface of the circular die which may be concentric with the center of the nut. As the metal is unconfined, it flows laterally outwardly under the die to produce the form of projection 16 shown in Figure 1. To form the projection 17 it is necessary merely to place the body 15 on an otherwise generally plane surface which has apertures appropriate to permit the metal to flow downwardly or outwardly below or from the bottom or end of the body 15 which rests on the forming surface.

It will be realized that whereas I have described and shown a practical and operative device, nevertheless many changes may be made in size, shape, number and disposition of parts without departing from the spirit of the invention. I therefore wish my description and drawings to be taken as in a broad sense illustrative and diagrammatic, rather than as limiting me precisely to the precise showing.

The use and operation of my invention are as follows:

In the application of my invention, I may start with the conventional square nut, or with a slug of metal, or with a section of wire, as the specific form of the nut may be widely varied.

While I do not wish to be limited to any specific shape of nut or any specific detail of forming or offsetting, a convenient arrangement is to employ a generally rectangular nut blank and to offset or outwardly spread its corners, as shown in Figure 1, by subjecting it to any suitable forming die. A practical forming die may have an internally arcuate or circular surface, as adapted to strike the corners, as indicated at 16a in Figure 1.

I claim:

The method of punch forming a weld nut by a single application of pressure, which includes providing a generally rectangular nut body having defined corners, a central aperture, and parallel plane end faces, supporting said nut body, except at localized areas under said corners, on a laterally unrestricted supporting surface, directing localized pressure solely against the corners of the nut body in a direction parallel with the axis of the nut and against the unsupported areas of the corners of the nut body, while permitting longitudinal flow of part of the metal at such unsupported areas and simultaneously permitting unrestricted lateral flow of the metal displaced by the pressure against the nut corners, and thereby, by a single application of pressure, forming laterally extended ears and welding projections unitary therewith, with the welding projections extending beyond the plane of the end of the nut body.

EARL E. HOWE.

REFERENCES CITED

The following references are of record in the file of this patent:

UNITED STATES PATENTS

| Number | Name | Date |
| --- | --- | --- |
| 2,054,187 | Almdale | Sept. 15, 1936 |
| 2,105,139 | Demoboski | Jan. 11, 1938 |
| 2,281,699 | Langmaid et al. | May 5, 1942 |
| 2,310,316 | Renner | Feb. 9, 1943 |
| 2,314,075 | Cousino | Mar. 16, 1943 |
| 2,335,593 | Howe | Nov. 30, 1943 |
| 2,336,791 | La Barre | Dec. 14, 1943 |
| 2,385,991 | Huntoon | Oct. 2, 1945 |